Nov. 15, 1955     A. S. PAGE     2,723,870

HINGED MOUNTING FOR VEHICLE AXLES

Filed April 1, 1952     2 Sheets-Sheet 1

INVENTOR.
ANGEL S. PAGE
BY
ATTORNEY

Nov. 15, 1955 — A. S. PAGE — 2,723,870
HINGED MOUNTING FOR VEHICLE AXLES
Filed April 1, 1952 — 2 Sheets-Sheet 2

INVENTOR.
ANCEL S. PAGE
BY F. R. Geisler.
ATTORNEY

United States Patent Office 2,723,870
Patented Nov. 15, 1955

2,723,870

HINGED MOUNTING FOR VEHICLE AXLES

Ancel S. Page, Portland, Oreg.

Application April 1, 1952, Serial No. 279,820

1 Claim. (Cl. 287—85)

This invention relates to dual axle vehicles in which the axles are directly connected with the vehicle frame through the medium of hinge assemblies so as to permit up and down movement of the vehicle frame with respect to the axles, instead of being mounted on so-called walking beams which in turn are pivotally connected to the vehicle frame.

In particular this invention relates to a dual axle vehicle suspension not only in which each of the two axles is separately connected with the vehicle frame by a pair of hinge assemblies but also in which torsion spring rods take the place of all ordinary springs, such as leaf springs or coil springs, in controlling the up and down movement of the vehicle frame and axles with respect to each other and in absorbing and cushioning the shocks transmitted from the wheels and axles to the vehicle frame.

In such a vehicle suspension the hinge assemblies connecting the axles with the vehicle frame are secured to main longitudinally-extending frame members, and the torsion spring rods as well as hinge shafts in the hinge assemblies are located in substantially horizontal planes parallel to such frame members. However, when a wheel, in a vehicle suspension of this type, is raised considerably above the level on which the other wheels are traveling, as occurs when one wheel rides over a substantial bump in the roadway, causing some raising of the immediate portion of the vehicle frame, a slight amount of bending of the frame momentarily takes place and the main longitudinally-extending frame members, located at opposite sides of the vehicle, to which frame members the hinge assemblies are secured, are consequently momentarily forced out of parallelism with each other. Under such condition a slight twisting strain is exerted on the hinge assemblies and a torsional twisting strain on the axles, and operation of the hinge assemblies while this condition is present increases the wear in certain parts of the assemblies.

The principal object of the present invention is to prevent this excessive wear and to enable the hinge assemblies to accommodate themselves more readily to such slight bending of the vehicle frame.

Since the twisting strain to which the hinge assemblies are subjected is also combined with a torsional strain on the vehicle axles when the axles are rigidly clamped to the hinge assemblies in the customary manner, a related object of the invention therefore is also to reduce such torsional strain on the axles by reducing the twisting strain in the hinge assemblies.

These objects and other incidental advantages I attain by means of certain improvements in the hinge assemblies or hinge mounting for the axles, the nature of which and the manner of operation of which will be readily understood from the following brief description with reference to the accompanying drawings, in which.

Figures 1, 2:
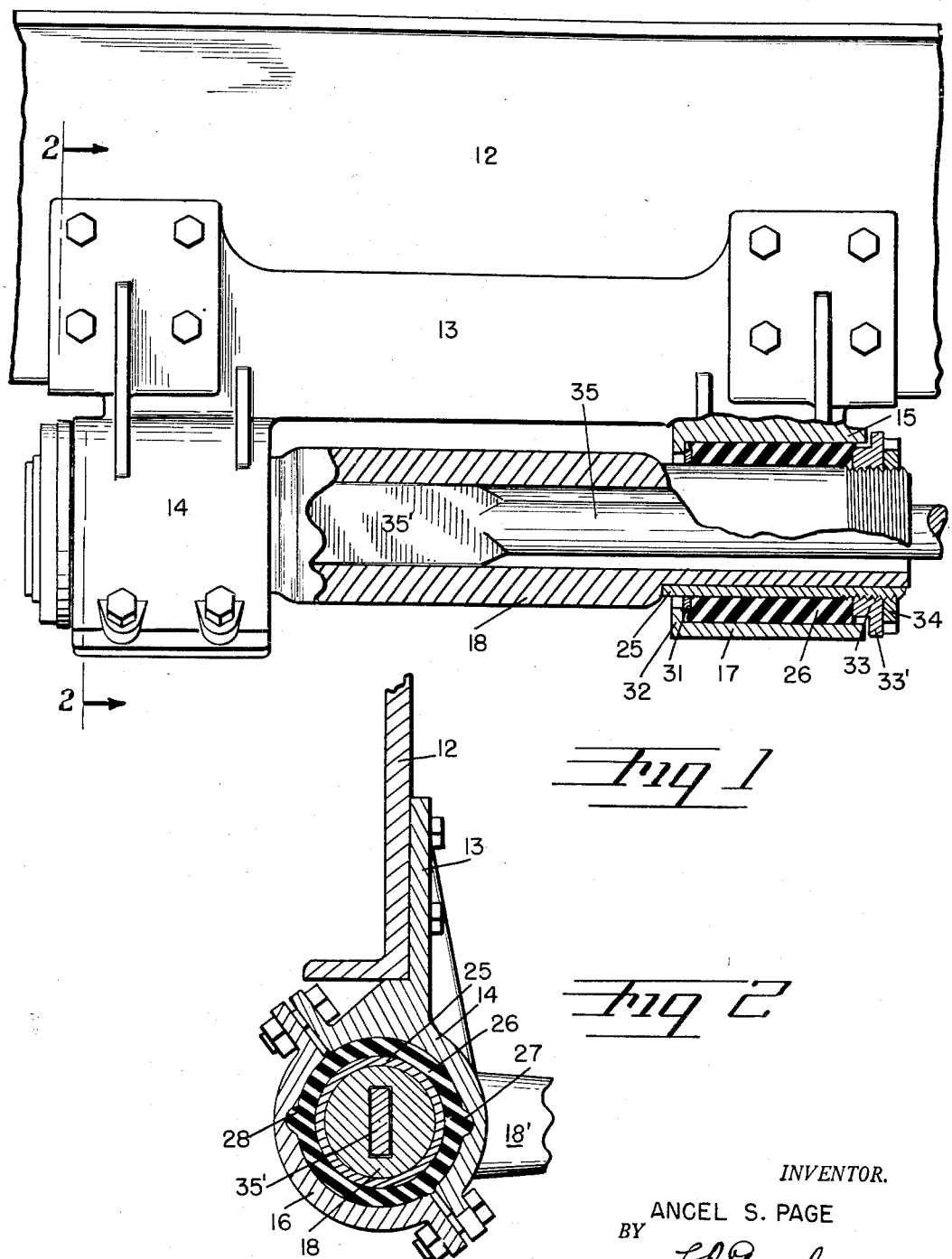
Figure 1 is a sectional elevation of a hinge assembly of a dual axle vehicle with portion of the main hinge shaft broken away and one of the hinge shaft bearings broken away for the sake of clarity.
Figure 2 is a section on line 2—2 of Figure 1.
Figure 3:
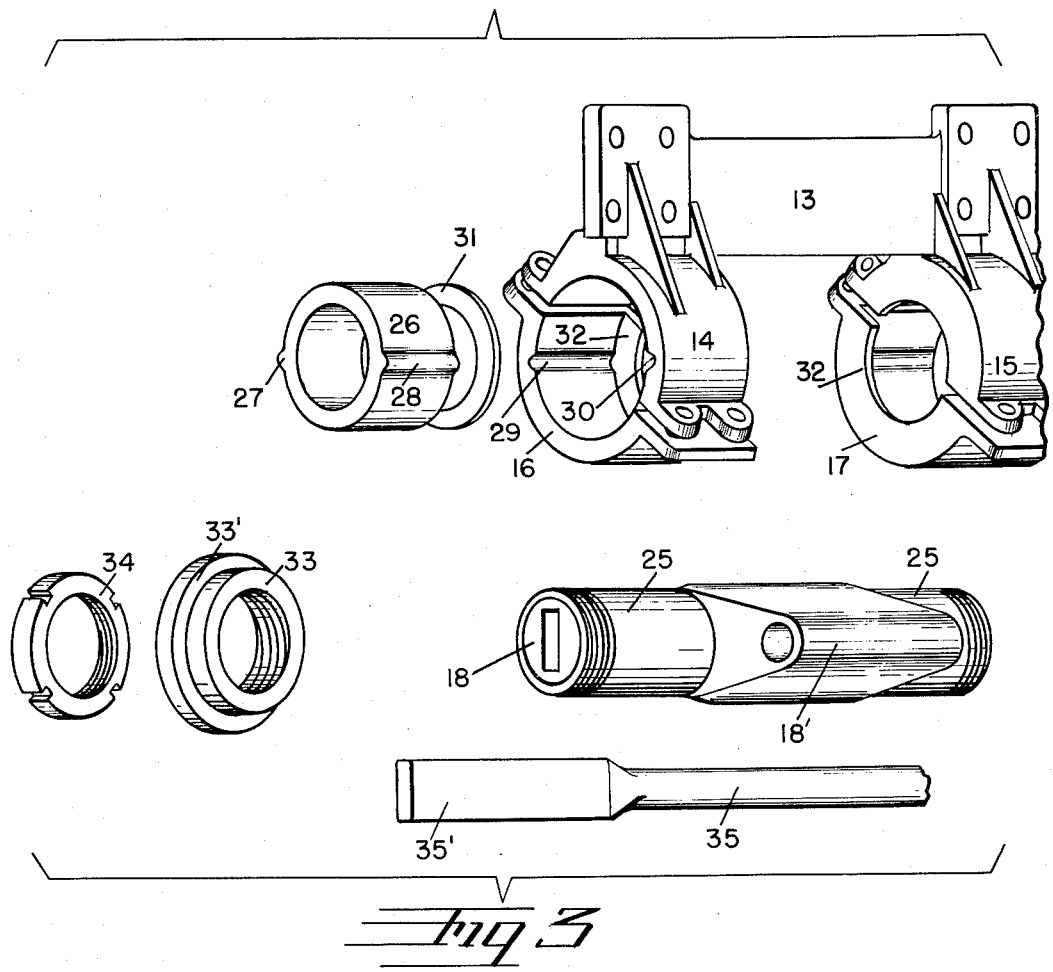
Figure 4:
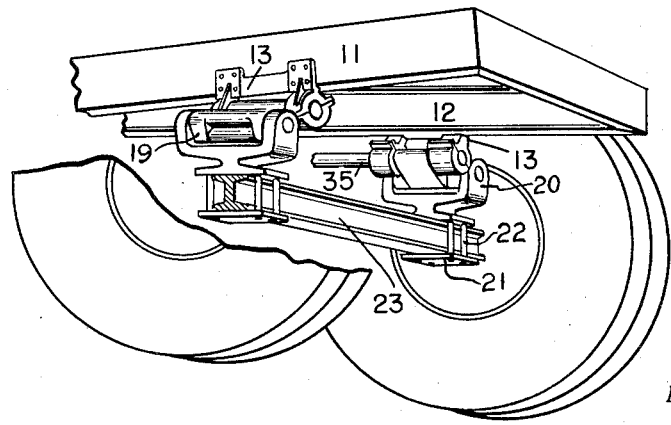

Figure 3 is an exploded view showing in perspective the two bearing housings, the resilient bushing for one housing together with the associated bushing clamping members, the main hinge shaft, and the related portion of the torsion spring rod for the hinge assembly shown in Figure 1; and Figure 4 is a fragmentary perspective view of the rear axle and hinge assemblies for such axle in such vehicle suspension, showing the position of the wheels, axle, hinge assemblies and vehicle frame under a particular condition, and illustrating how the twisting strain previously referred to is produced. In this figure the near side wheel and the near side spindle end of the axle have been broken away for clarity.

The vehicle frame (Figures 1 and 4) includes two main longitudinally-extending frame members 11 and 12 located on opposite sides, and each axle, such as the rear axle 23 shown in Figure 4, of the dual axle vehicle suspension is connected with the main frame members 11 and 12 by a pair of similar hinge assemblies, the end portions of each axle being clamped to the bottom of the respective hinge assemblies as shown in Figure 4. The present invention is carried out separately, similarly, in each of the hinge assemblies and since the hinge assemblies are all similar it will suffice to describe one of the hinge assemblies, namely the far side hinge assembly (Figure 4) for the rear axle 23.

The hinge assembly includes a frame bracket 13 which is securely bolted to a frame member such as the frame member 12. A torsion hinge shaft 18 is pivotally mounted in the frame bracket 13 and a torsion hinge arm 18' extends from the hinge shaft 18. An upstanding axle bracket 20 is mounted on the axle 23 and securely clamped thereto by means of a bottom clamping plate 21 (Figure 4) and clamping bolts 22, and a link 19 connects the upper end of the axle bracket 20 and the outer end of the torsion hinge arm 18'.

A torsion spring rod 35 (Fig. 1) has one end securely mounted in the hinge shaft 18. Similar torsion spring rods are similarly secured in the hinge shaft for the other hinge assemblies and the forward ends of the pair of torsion spring rods on each side of the vehicle are connected by meshing gears (not shown) as is well known in this type of vehicle suspension.

When one of the wheels in this type of vehicle suspension is raised considerably above the level on which the other wheels are traveling, causing some raising of the immediate portion of the vehicle frame, as illustrated in Figure 4, and thus momentarily moving one frame member 11 out of parallelism with the other frame member 12, it will be apparent that a twisting strain is exerted on the opposite hinge assemblies and a torsional twisting strain on the axle secured to them, since the frame brackets 13 for the assemblies are rigidly attached to their respective main frame members. When the hinge assemblies move up and down in the presence of such strain an excessive amount of wear has heretofore resulted, particularly in the main torsion hinge shaft 18 and the bearings for the same. To absorb the twisting strain and to enable the hinge assemblies to accommodate themselves when the main frame members are moved slightly out of parallelism in this manner, and thus prevent excessive wear in the hinge assemblies, as well as exceptional torsional strain on the axle, I provide special hinge mountings for the torsion hinge shaft 18.

Each frame bracket is formed with an integral pair of semi-cylindrical bearing housings 14 and 15 (Figure 3) to which semi-cylindrical companion bearing housings 16 and 17 are adapted to be clamped so as to form the spaced housings for the bearings for the hinge shaft 18. Preferably, though not necessarily, a metal sleeve 25 (Figures 1 and 2) is welded on each end of the hinge shaft 18, the outer ends of these sleeves being threaded. A rubber bushing 26 (or a bushing of similar resilient compressible material) is placed about each of the sleeves 25. The rubber bushings 26 are of sufficient thickness so that the clamping of the semi-cylindrical bushing housings 14, 16 and 15, 17 together will produce radial compression of the bushings, the amount of such compression being adjustable by the clamping bolts as apparent from Figure 2. I prefer to have each rubber bushing formed with a pair of diagonally opposite longitudinally-extending outer ribs 27 and 28 (Figures 2 and 3) and to provide the cylindrical bushing housing with grooves 29 and 30 to correspond to these ribs.

The inner ends of the pairs of semi-cylindrical bushing housings 14, 16 and 15, 17 have an inturned flange 32 (Figures 1 and 3). The inner periphery of the flanges 32 is of greater diameter than the outer surface of the sleeves 25, as shown in Figure 1, in order to allow for a slight amount of movement of the hinge shaft and sleeves out of axial alignment with the bushing housings without coming into actual metal-to-metal contact with the bushing housing. A washer 31, having an inner diameter equal approximately to the outer diameter of the sleeve 25 and an outer diameter slightly greater than the inner periphery of the flange 32 but less than the inner diameter of the bushing housing, is placed on each sleeve 25 before the rubber bushing is set in place and is positioned on the inside of the flange 32.

When the hinge shaft with its pair of rubber bushings and washers 31 is mounted in the housings 14, 16 and 15, 17 a compression nut 33 is screwed on the threaded outer end of each sleeve 25. As shown in Figures 1 and 3, each compression nut has an inner bushing-engaging portion of smaller diameter than the interior diameter of the bushing housing and also has an outer annular flange 33′ of larger diameter.

Thus each rubber bushing 26, when in place in the bushing housing, is subjected to adjustable radial pressure inwardly by the clamping bolts which clamp the two semi-cylindrical halves of the housing together, and is subjected to adjustable longitudinal compression by the compression nut 33. A lock nut 34 is provided for each compression nut so as to lock the compression nut in the desired position for longitudinal compression of the rubber bushing.

The pair of rubber bushings for the torsion hinge shaft 18 not only permit some rotation of the shaft in the supporting bracket 13 without any wear, in the manner customary with such rubber bushings, but also enable the hinge shaft to be moved slightly out of axial alignment in the bracket 13 and slightly out of parallelism with the main frame member, as apparent from Figure 1. In other words, referring to Figure 4, when the two main frame members 11 and 12 are temporarily forced out of parallelism, as previously described, the torsion hinge shafts in the hinge assemblies, through their rubber bushings, will adjust themselves so as to relieve the hinge assembly from any excessive twisting action, incidentally relieving the axles from an excessive corresponding torsional twisting strain, and no excessive wear will occur therefore when the hinge assemblies function under such conditions.

The torsion spring rod 35 for each hinge assembly has its end secured in the torsion hinge shaft 18 as is customary. The end portion 35′ of the torsion rod 35 is flattened, as shown in Figures 1 and 3, and the corresponding portion of the interior channel in the hinge shaft is reduced and made to correspond to the cross section of the portion 35′, causing the portion of the torsion spring rod within the shaft 18 to be rotated in unison with the shaft.

I claim:

In a vehicle axle hinge assembly of the character described including a rigidly-mounted bracket and a torsion hinge shaft carried by said bracket, a pair of axially-aligned bushing housings on said bracket, a resilient bushing for said shaft in each housing, each of said housings comprising a pair of cylinder sections, clamping bolts adjustably clamping said sections together and causing inward radial pressure to be exerted on said bushings, an inturned annular flange at the inner end of each housing, the inner peripheries of said flanges being of greater diameter than said shaft, a washer on said shaft inside each of said housings positioned between said inturned flange and said bushing, the outer periphery of each of said washers being of greater diameter than the said inner peripheries of said flanges but of less diameter than the outer diameter of said bushings and the inside diameter of said housing sections, and a pair of adjustable compression elements on said shaft at the outer ends of said housings respectively, each of said compression elements having an inner portion with a periphery of less diameter than the outer diameter of said bushings and the inside diameter of said housing sections and extending into the respective housings, and each compression element having an outer portion with a periphery having a diameter greater than the outer diameter of said bushings and the inside diameter of said housing sections, whereby said bushings will be completely contained in said housings and maintained under desired compression while said shaft may be moved slightly out of axial alignment with respect to said housings.

References Cited in the file of this patent

UNITED STATES PATENTS

| | | |
|---|---|---|
| 1,476,355 | Borst, Jr. | Dec. 4, 1923 |
| 2,026,076 | Spicer | Dec. 31, 1935 |
| 2,188,952 | Leighton | Feb. 6, 1940 |
| 2,390,168 | Piot | Dec. 4, 1945 |
| 2,435,199 | Buckendale | Feb. 3, 1948 |
| 2,481,891 | Van Raden | Sept. 13, 1949 |
| 2,522,350 | Ditter | Sept. 12, 1950 |